United States Patent
Suzuki et al.

(10) Patent No.: US 6,711,142 B1
(45) Date of Patent: Mar. 23, 2004

(54) COMMUNICATION APPARATUS, COMMUNICATION SYSTEM, AND METHOD OF THE SAME

(75) Inventors: Mitsuhiro Suzuki, Chiba (JP); Takushi Kunihiro, Tokyo (JP); Tomoya Yamaura, Tokyo (JP); Kazuyuki Sakoda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/500,099

(22) Filed: Feb. 8, 2000

(30) Foreign Application Priority Data

Feb. 9, 1999 (JP) ............................................. 11-031876

(51) Int. Cl.[7] .................................................. H04Q 7/00
(52) U.S. Cl. ....................................... 370/329; 370/341
(58) Field of Search ................................. 370/329, 337, 370/341, 343, 347, 431, 442, 465, 316

(56) References Cited

U.S. PATENT DOCUMENTS

| 4,918,746 A | * | 4/1990 | Serizawa | 455/524 |
| 5,438,609 A | * | 8/1995 | Yahagi | 455/456 |
| 5,629,974 A | * | 5/1997 | Rajala et al. | 455/466 |
| 5,754,961 A | * | 5/1998 | Serizawa et al. | 455/517 |
| 5,802,475 A | * | 9/1998 | Kishida et al. | 455/453 |
| 5,940,769 A | * | 8/1999 | Nakajima et al. | 455/509 |
| 6,049,721 A | * | 4/2000 | Serizawa et al. | 455/509 |

FOREIGN PATENT DOCUMENTS

| EP | 0 700 225 | 3/1996 |
| GB | 2 313 981 | 12/1997 |

* cited by examiner

Primary Examiner—Ajit Patel
Assistant Examiner—Chirag Shah
(74) Attorney, Agent, or Firm—Frommer Lawrence & Haug LLP; William S. Frommer; Dennis M. Smid

(57) ABSTRACT

A communication apparatus capable of increasing a bit rate of communication in the down direction by using an existing bidirectional communication system, wherein mobile management, call control, wireless management, etc. are performed and communication conditions are controlled by bidirectional communication between a high speed downlink base station and a high speed downlink control portion of a terminal device via a cellular network and a cellular base station. Then, a content signal is transmitted from the high speed downlink base station to the terminal device via the high speed downlink network.

20 Claims, 10 Drawing Sheets

COMMUNICATION APPARATUS, COMMUNICATION SYSTEM, AND METHOD OF THE SAME

BACKGROUND OF THE INVENTION

1. Field of the Invention

The present invention relates to a communication apparatus for receiving a content signal, a communication apparatus for transmitting a content signal, a communication system for transmitting and receiving a content signal, and methods for the same.

2. Description of the Related Art

In recent years, along with the development of Internet, computer, mobile communication, and other technologies, it has become possible for individual users to obtain a variety of content data in accordance with need at a necessary time and at a necessary place.

In a communication system using existing Internet and mobile communications, a specific communication line established by using an integrated services digital network (ISDN), a cellular system using an up-down channel, or another communication media able to communicate bidirectionally is used for transmitting a content request signal from a terminal device of a user to a server device and for transmitting a content signal in accordance with the content request signal from the server device to the terminal device which sent the content request signal.

In this case, in an existing cellular system, the bit rate (communication capacity) at the time of transmitting a signal from a server device to a terminal device (down direction) and a bit rate at the time of transmitting a signal from the terminal device to the server device are the same. Furthermore, the time assigned for an up direction and the down direction are also the same.

However, since the amount of data of a content signal to be transmitted from the server device to the terminal device (down direction) is normally very large compared with that of a signal transmitted from the terminal device to the server device, there is a disadvantage that the communication time in the down direction always becomes longer.

Therefore, a communication system assigning a longer time for the communication of the down direction than that of the up direction within a unit time in a time division duplex (TDD) system has been proposed.

As explained above, however, although a longer time is assigned to the communication of the down direction than that of the up direction within a unit time, the bit rates themselves are same in the communication of the down direction and that of the up direction and there is a limit in shortening the communication time of the down direction.

Also, in the up direction communication, it becomes necessary to increase the transmission power of the terminal device by the amount of shortening of the time assigned for the up direction communication within the unit time, there is a limit to an assignable time for the down direction communication for a unit time, and thus the communication time for the down direction cannot be sufficiently shortened.

Also, there is a disadvantage that the load involved in changing an existing cellular system where the communication times for the up direction and down direction communications within a unit time are set to be the same so that a longer time is assigned to the down direction communication than the up-direction communication within a unit time becomes large.

SUMMARY OF THE INVENTION

An object of the present invention is to provide a communication apparatus for receiving a content signal, a communication system for transmitting a content signal, and a communication system for receiving and transmitting a content signal capable of improving the bit rate of the down direction communication by using an existing bidirectional communication system and methods of the same.

To solve the above disadvantages of the prior art and to achieve the above object, a communication apparatus according to a first aspect of the present invention comprises a communication apparatus comprising a transmitting and receiving means for transmitting and receiving a control signal to and from a first communication apparatus; a first control means for controlling the bidirectional communication between said first communication apparatus using said transmitting and receiving means; a receiving means for receiving a content signal from a second communication apparatus; and a second control means for transmitting and receiving a control signal to and from said second communication apparatus via said first communication apparatus by using said bidirectional communication controlled by said first control means and controlling the reception of said content signal by said receiving means based on results of the transmission and reception.

Furthermore, the communication apparatus according to the first aspect of the present invention specifically has transmitting and receiving means which transmits and receives said control signal to and from said first communication apparatus by using a first wireless network and has receiving means which receives said content signal from said communication apparatus by using a second wireless network.

Also, the communication apparatus according to the second aspect of the present invention provides a communication apparatus comprising a transmitting and receiving means for transmitting and receiving a control signal to and from an other communication apparatus; a first control means for controlling bidirectional communication with said other communication apparatus using said transmitting and receiving means; a transmitting means for transmitting a content signal to said other communication apparatus; and a second control means for transmitting and receiving said control signal to and from said other communication apparatus by using said bidirectional communication controlled by said first control means and controlling transmission of said content signal by said transmitting means based on results of said transmission and reception.

Also, the communication system of the present invention is a communication system for performing bidirectional communication between a first communication apparatus and a second communication apparatus, wherein said first communication apparatus comprises a first transmitting and receiving means for transmitting and receiving a control signal with said second communication apparatus; a first control means for controlling bidirectional communication with said second communication apparatus using said first transmitting and receiving means; a transmitting means for transmitting a content signal to said second communication apparatus; and a second control means for transmitting and receiving said control signal to and from said second communication signal by using said bidirectional communication controlled by said first communication means and controlling transmission of said content signal by said first transmitting means based on results of the transmission and reception; and aid second communication apparatus comprises a second transmitting and receiving means for transmitting and receiving a control signal with said first communication apparatus; a third control means for controlling bidirectional communication with said second communication apparatus using said second transmitting and receiving means; a receiving means for receiving a content signal from said second communication apparatus; and a fourth control means for transmitting and receiving said control signal to and from said second communication signal by using said bidirectional communication controlled by said third communication means and controlling reception of said content signal by said receiving means based on results of the transmission and reception.

Also, the communication method of the present invention is a communication method for performing bidirectional communication between a first communication apparatus and a second communication apparatus including the steps of performing bidirectional communication between said first communication apparatus and said second communication apparatus via a first wireless network; transmitting a content signal from said first communication apparatus to said second communication apparatus via a second wireless network; and performing mobile management, call control, and wireless management necessary for said bidirectional communication using said first wireless network in an independent form from mobile management, call control, and wireless management necessary for receiving said content signal using said second wireless network.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Below, a communication system according to embodiments of the present invention will be explained.

First Embodiment

Figure 1:
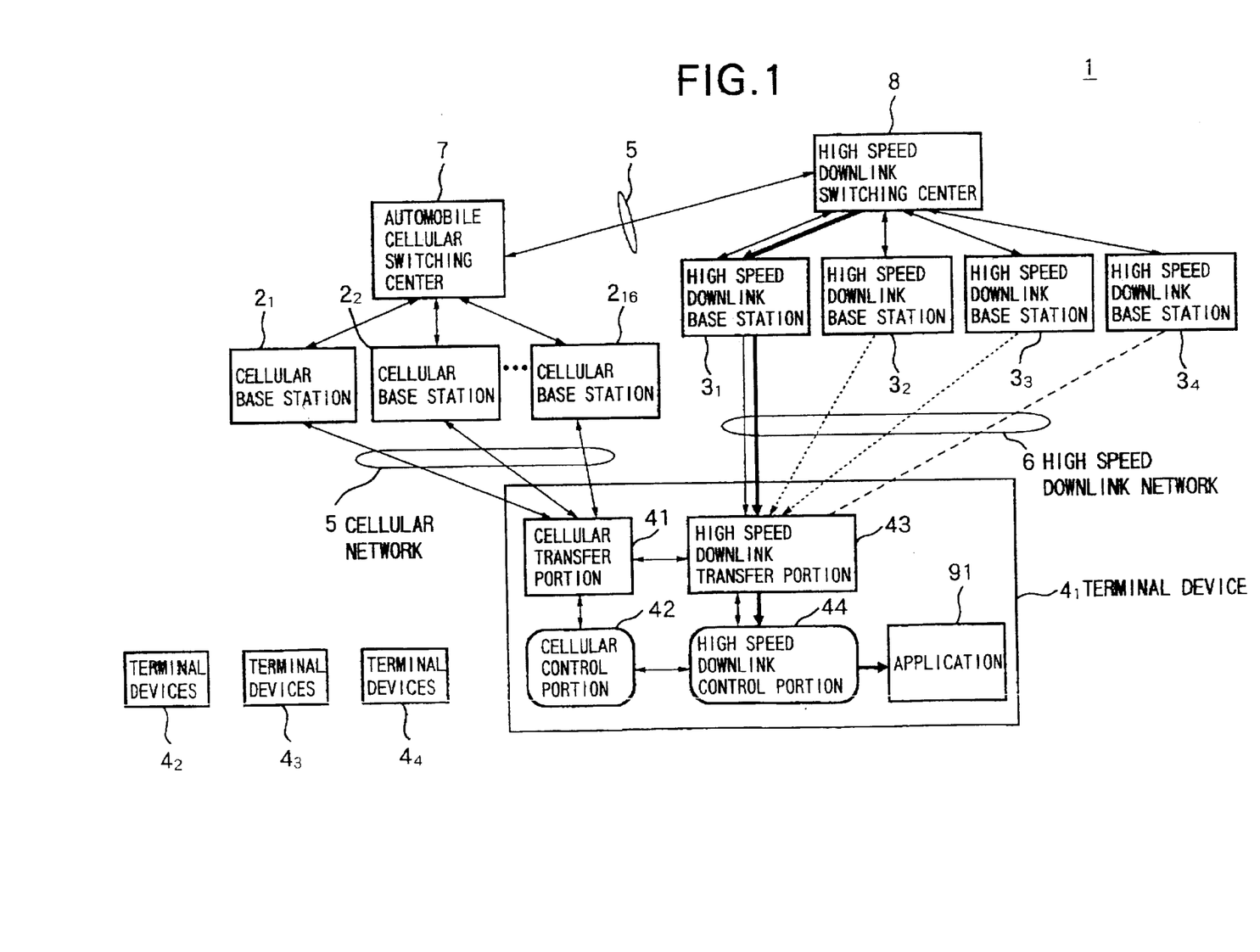
FIG. 1 is a view of the configuration of a communication system according to a first embodiment of the present invention.
Figure 2:
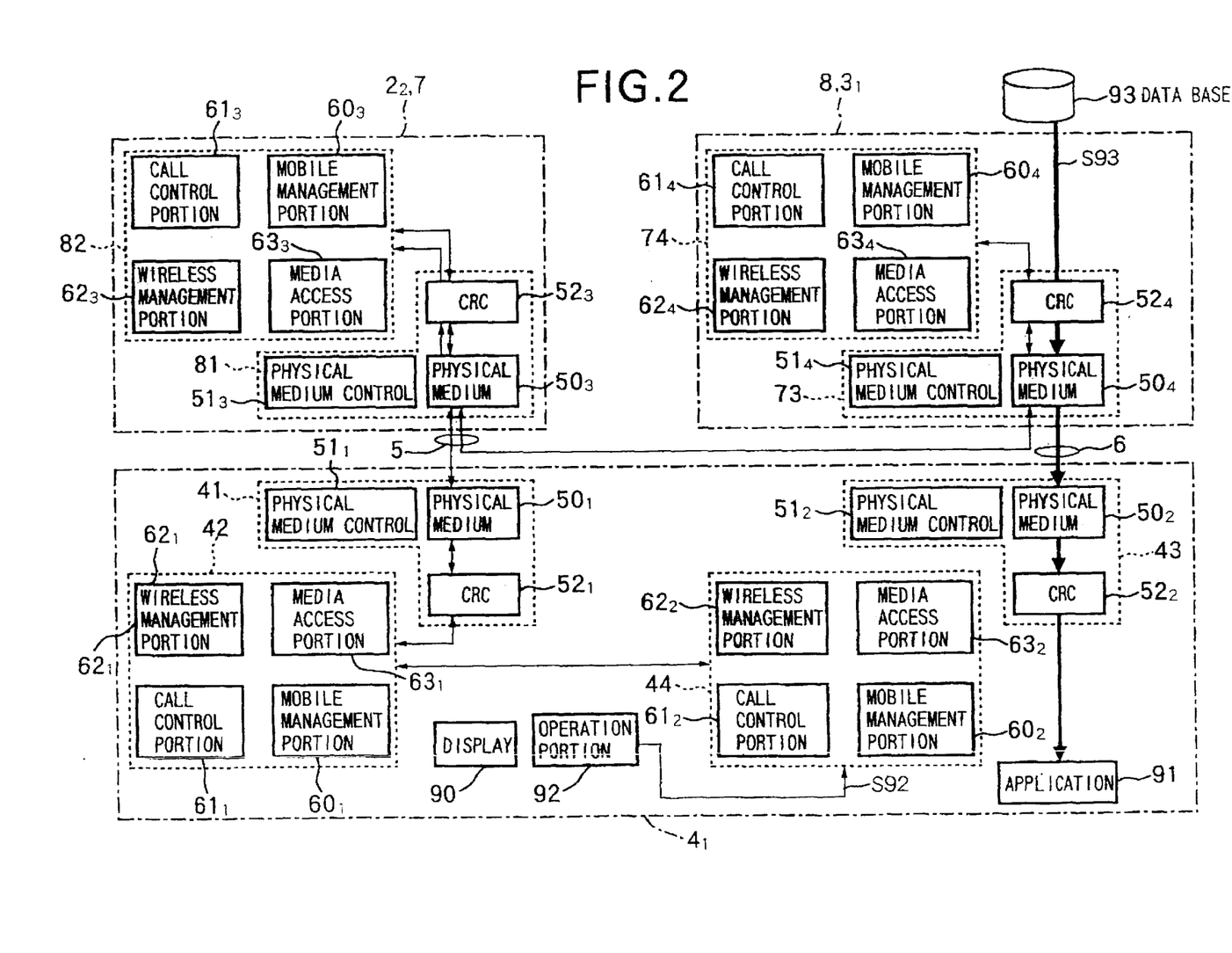
FIG. 2 is a view of the configuration inside the blocks shown in FIG. 1.

FIG. 1 is a view of the configuration of a communication system 1 of the present embodiment and FIG. 2 is a view of the configuration of the insides of the blocks shown in FIG. 1.

As shown in FIG. 1, the communication system 1 comprises cellular base stations $2_1$ to $2_{16}$, high speed downlink base stations $3_1$ to $3_4$, terminal devices $4_1$ to $4_4$, a mobile switching center (MSC) 7, and a high speed downlink switching center 8.

Here, bidirectional communication using the cellular network 5, that is, cellular communication, is performed between the cellular base stations $2_1$ to $2_{16}$ and the terminal devices $4_1$ to $4_4$ and between an automobile cellular switching center 7 and the high speed downlink switching center 8. Furthermore, transmission using the high speed downlink network 6 is performed from the high speed downlink base stations $3_1$ to $3_4$ to the terminal devices $4_1$ to $4_4$.

Note that the numbers of the cellular base stations, high speed downlink base stations, and terminal devices are not limited to the ones shown in FIG. 1 in the present invention.

[Cellular Network 5]

In the cellular network 5, for example, a frequency bandwidth of 800 MHZ band is used, a service area is comprised by a plurality of cells, the wireless access method is the Time Division Duplex (TDD) mode wherein the same time is assigned in the up and down directions within a unit time, and the modulation format is the Quadrature Phase Shift Keying (QPSK).

Here, in communication via the cellular network 5, bidirectional communication is performed between communication nodes, and call control for assigning a channel in accordance with an occurrence of a call between the communication nodes (connecting the communication lines), position registration control for registering a position of a communication node when the communication node moves geographically, cell switching control during communication enabling transition of cells during communication, and end conversation control for disconnecting the channel in accordance with an end of the call are performed.

In the present embodiment, the cellular base stations $2_1$ to $2_{16}$, terminal devices $4_1$ to $4_4$, automobile cellular switching center 7, and high speed downlink switching center 8 correspond to communication nodes.

Also, the cellular network 5 provides access control and bidirectional communication at a low bit rate between the high speed downlink base stations $3_1$ to $3_4$ and the terminal devices $4_1$ to $4_4$ when transmitting a content signal from the high speed downlink base stations $3_1$ to $3_4$ to the terminal devices $4_1$ to $4_4$ via the high speed downlink network 6.

Figure 3:
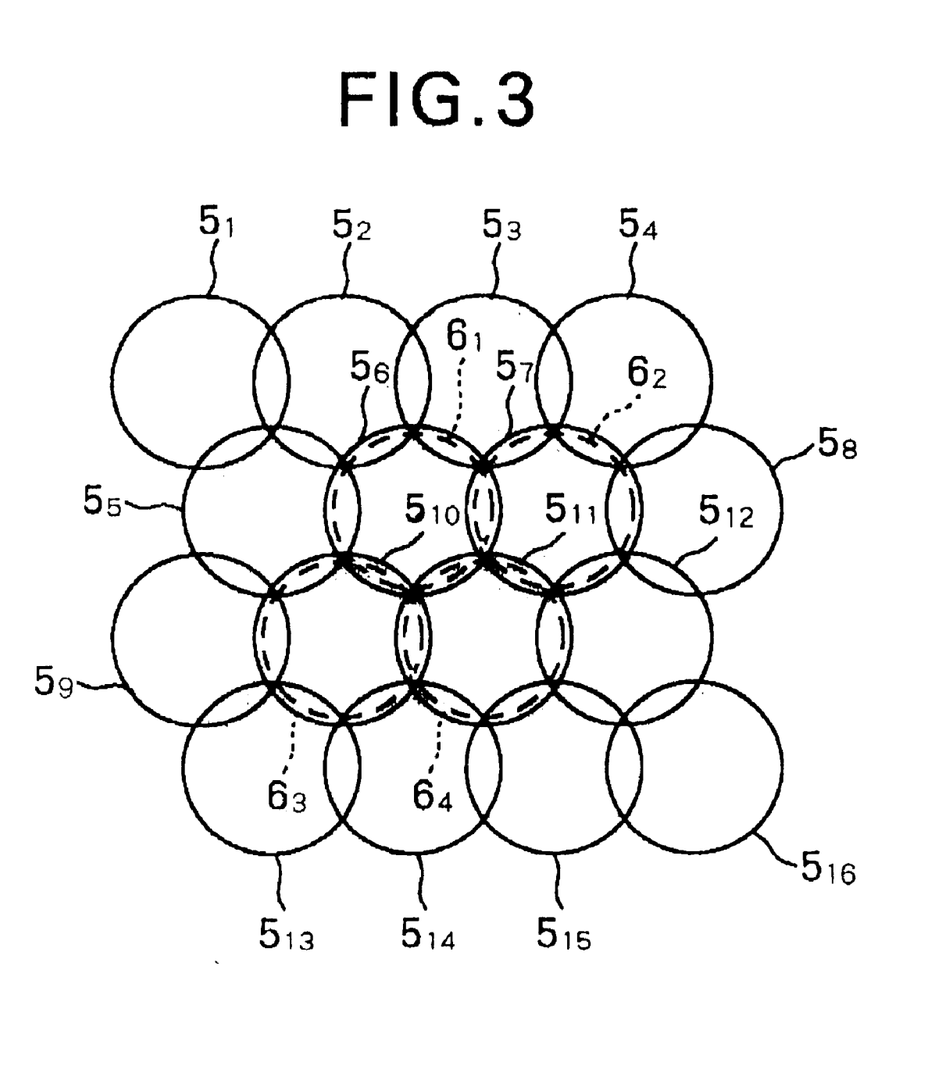
FIG. 3 is a view for explaining service areas of a cellular network and a high speed downlink network shown in FIG. 1.

Note that the service area of the cellular network 5 is comprised of, for example, circular service areas $5_1$ to $5_{16}$ indicated by solid lines in FIG. 3 provided by 16 cells.

[High Speed Downlink Network 6]

In the high speed downlink network 6, a frequency bandwidth of, for example, 2 to 5 GHz is used, the service area is composed of a plurality of cells, and the modulation format is Quadrature Phase Shift Keying (QPSK).

In communication via the high speed downlink network 6, only one directional communication from the high speed downlink base stations $3_1$ to $3_4$ to the terminal devices $4_1$ to $4_4$ is performed. Specifically, only transmission of a content signal at a high bit rate from the high speed downlink base stations $3_1$ to $3_4$ to the terminal devices $4_1$ to $4_4$ is performed.

Note that as a high speed downlink network 6, for example, a wireless system having a higher bit rate than that of the cellular network 5 is used.

Also, in the present embodiment, the content signal can be any of a video signal, audio signal, computer program, etc.

Note that the service area of the high speed downlink network 6 is, for example, composed of circular service areas $6_1$ to $6_4$ indicated by dotted lines in FIG. 3 provided by four cells.

Below, the components shown in FIG. 1 will be explained in detail.

[Cellular Base Stations $2_1$ to $2_{16}$]

The cellular base stations $2_1$ to $2_{16}$ provide service areas $5_1$ to $5_{16}$ of the cellular network 5 shown in FIG. 3.

Here, the cellular base stations $2_1$ to $2_{16}$ have the same configuration, so the configuration of only the cellular base station $2_2$ will be explained below.

Note that the function blocks of the cellular base station $2_2$ are sometimes realized integrated with the automobile cellular switching center 7, so the configuration of the cellular base station $2_2$ will be explained as being integrated with the configuration of the automobile cellular switching center 7.

As shown in FIG. 2, the cellular base station $2_2$ and the automobile cellular switching center 7 comprise a cellular transfer portion 81 and a cellular control portion 82.

The cellular transfer portion 81 comprises a physical medium $51_3$, physical medium control portion $51_3$, and CRC processing portion $52_3$.

The physical medium $50_3$ is a portion directly acting on the cellular network 5.

The physical medium control portion $51_3$ performs determination, control, etc. of a wireless frequency, bandwidth, modulation format, and transfer rate.

The CRC processing portion $52_2$ performs error correction processing using cyclic redundancy check (CRC) on a signal input from the physical medium $50_3$ via the cellular network 5 and processing to add a CRC code to a signal input from the cellular control portion 82.

The cellular control portion 82 comprises a mobile managing portion $60_1$, call controlling portion $61_3$, wireless management portion $62_3$, and media access portion $63_3$.

The mobile controlling portion $60_3$ supports mobility of the terminal devices $4_1$ to $4_4$ in the cellular network 5 and performs position registration and authentication etc. with the terminal devices $4_1$ to $4_4$.

The call control portion $61_3$ performs signal transmission, signal reception, hand-over, cut-off, etc. via the cellular network 5.

The wireless management portion $62_3$ selects cells of the cellular network 5 and performs setting, maintenance, switching, disconnection, etc. of the cellular network 5.

The media access portion $63_3$ performs medium access control of the cellular network 5.

[Terminal Devices $4_1$ to $4_4$]

Since the terminal devices $4_1$ to $4_4$ have the same configuration, the configuration of only the terminal device $4_1$ will be explained below.

As shown in FIGS. 1 and 2, the terminal device $4_1$ comprises a cellular transfer portion 41, cellular control portion 42, high speed downlink transfer portion 43, high speed downlink control portion 44, display 90, application 91, and operation portion 92.

The cellular transfer portion 41 comprises a physical medium $50_1$, physical medium control portion $51_1$, and CRC processing portion $52_1$.

The physical medium $50_1$ is a portion directly acting on the cellular network 5.

The physical medium control portion $51_1$ decides and controls a wireless frequency, bandwidth, modulation format, and transfer rate for the physical medium $50_1$.

The CRC processing portion $52_1$ performs error correction processing using cyclic redundancy check (CRC) on a signal input from the physical medium $50_1$ via the cellular network 5 and processing to add a CRC code to a signal input from the cellular control portion 42.

The cellular control portion 42 comprises a mobile managing portion $60_1$, call controlling portion $61_1$, wireless management portion $62_1$, and media access portion $63_1$.

The mobile controlling portion $60_1$ supports mobility of the terminal device $4_2$ while communicating with the mobile management portion $60_3$ of the cellular base stations $2_1$ to $2_{16}$ and performs position registration and authentication function, etc.

The call control portion $61_1$ performs signal transmission, signal reception, hand-over, cut-off, etc. via the cellular network 5.

The wireless management portion $62_1$ selects cells of the cellular network 5 and performs setting, maintenance, switching, disconnection, etc. of the cellular network 5.

The media access portion $63_1$ performs medium access control of the cellular network 5.

The high speed downlink transfer portion 43 comprises a physical medium $50_2$, physical medium control portion $51_2$, and CRC processing portion $52_2$.

The physical medium $50_2$ is a portion directly acting on the high speed downlink network 6.

The physical medium control portion $51_2$ performs determination, control, etc. of a wireless frequency, bandwidth, modulation format, and transfer rate for the physical medium $50_2$.

The CRC processing portion $52_2$ performs error correction processing using CRC on a signal input from the physical medium $50_2$ via the high speed downlink network 6.

The high speed downlink control portion 44 comprises a mobile managing portion $60_2$, call controlling portion $61_2$, wireless management portion $62_2$, and media access portion $63_2$.

The mobile controlling portion $60_2$ supports mobility of the terminal device $4_1$ in the high speed downlink network 6 with the high speed downlink switching center 8 and the mobile control portion $60_4$ of the high speed downlink base stations $3_1$ to $3_4$ and performs position registration and authentication etc.

The call control portion $61_2$ performs signal transmission, signal reception, hand-over, cut-off, etc. via the cellular network 5 with the high speed downlink switching center 8 and the call control portion $61_4$ of the high speed downlink base stations $3_1$ to $3_4$ via the cellular network 5.

The wireless management portion $62_2$ selects cells of the high speed downlink network 6 and performs setting, maintenance, switching, disconnection, etc. of the high speed downlink network 6 while communicating with the high speed downlink switching center 8 and the wireless management portion $62_4$ of the high speed downlink base stations $3_1$ to $3_4$.

The application 91 performs processing using a content signal S93 input from the high speed downlink transfer portion 43 and outputs for example a video image and audio sound in accordance with the content signal S93 respectively from a display and a speaker.

The operation portion 92 has at least one operation means such as a keyboard, mouse, and buttons and outputs an operation signal S92 specifying the content the user wishes to have played to the high speed downlink control portion 44 in accordance with a user's operation.

[High Speed Downlink Base Stations $3_1$ to $3_4$]

The high speed downlink base stations $3_1$ to $3_4$ respectively provide service areas $6_1$ to $6_4$ of the high speed downlink network 6 shown in FIG. 3.

Here, the high speed downlink base stations $3_1$ to $3_4$ have the same configuration, so the configuration of only the high speed downlink base station $3_1$ will be explained below.

Note that the function blocks of the high speed downlink base station $3_1$ are sometimes realized integrated with the high speed downlink switching center 8, so the configuration of the high speed downlink base station $3_1$ will be explained as being integrated with the configuration of the high speed downlink switching center 8.

As shown in FIG. 3, the high speed downlink base station $3_1$ and the high speed downlink switching center 8 comprise a high speed downlink transfer portion 73 and a high speed downlink control portion 74.

The high speed downlink transfer portion 73 comprises a physical medium $50_4$, physical medium control portion $51_4$, and CRC processing portion $52_4$.

The physical medium $50_4$ is a portion directly acting on the high speed downlink network 6.

The physical medium control portion $51_4$ performs determination, control, etc. of a wireless frequency, bandwidth, modulation format, and transfer rate on the physical medium $50_4$.

The CRC processing portion $52_4$ adds a CRC code to a content signal S93 input from a data base 93.

The high-speed downlink control portion 44 comprises a mobile managing portion $60_2$, call controlling portion $61_2$, wireless management portion $62_2$, and media access portion $63_2$.

The mobile controlling portion $60_4$ performs communication with the mobile managing portion $60_2$ of the high-speed downlink control portion 44 of the terminal devices $4_1$ to $4_4$ via the cellular network 5, supports mobility of the terminal devices $4_1$ to $4_4$ in the high-speed downlink network 6 and performs position registration and authentication etc.

The call control portion $61_3$ performs signal transmission, signal reception, hand-over, disconnection, etc. via the cellular network 5.

The wireless management portion $62_4$ performs communication with the mobile managing portion $60_2$ of the high-speed downlink control portion 44 of the terminal devices $4_1$ to $4_4$ via the cellular network 5, selects cells of the high-speed downlink network 6 and performs setting, maintenance, switching, disconnection, etc. of the high-speed cellular network 6.

Below, examples of the operation of the communication system 1 will be explained.

[First Example of Operation]

In this example of operation, an example of the operation in the transmission reception waiting state in the terminal device $4_1$ will be explained.

Figure 4:
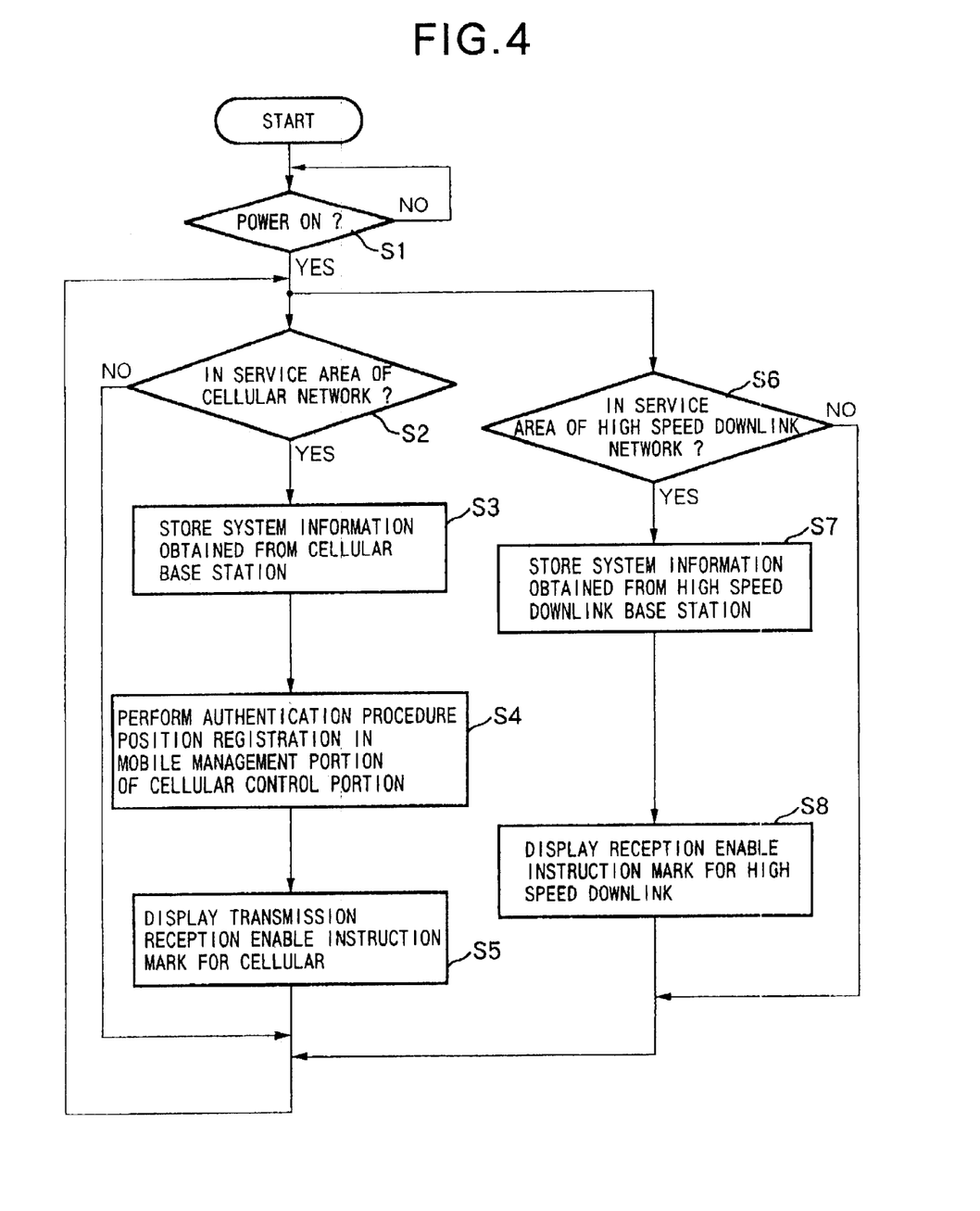
FIG. 4 is a flow chart of an example of operation of a terminal device in a transmission and reception waiting state.

FIG. 4 is a flow chart of an example of the operation in the transmission reception waiting state in the terminal device $4_1$.

Step S1: In the terminal device $4_1$, it is judged if a power switch is turned on and the power is on. When judging that the power is on, the processing of step S2 is executed, while if otherwise, the processing of step S1 is repeated.

Step S2: In the physical medium control portion $51_1$ of the cellular transfer portion 41 of the terminal device $4_1$, it is judged whether or not the physical medium $50_1$ has received a reporting channel BCCH (broadcast control channel) of the cellular network 5. When it is judged that the channel is received, it is judged that the terminal device $4_1$ is in the service area of the cellular network 5 and the processing of step S3 is executed, while if otherwise, the processing of steps S2 and S6 are repeated.

Step S3: The system information obtained from the report channel BCCH of the cellular network 5 is stored in the physical medium control portion $51_1$.

The system information is information indicating the configuration of the physical channel such as a coding format and operating state of the system.

Step S4: In the mobile management portion $60_1$ of the cellular control portion 42 of the terminal device $4_1$, the position registration and authentication procedures are performed for notifying the position of the terminal device $4_1$ in units of cells with the automobile cellular switching center 7 via the cellular network 5.

Step S5: In the mobile management portion $60_1$, when the processing of step S4 is completed, a transmission-reception enable instruction mark indicating that communication via the cellular network 5 is possible is displayed on the display 90.

Step S6: In the physical medium control portion $51_2$ of the high speed downlink transfer portion 43 of the terminal device $4_1$, it is judged whether or not the physical medium $50_2$ has received the report channel BCCH of the high speed downlink network 6. When judged that it is received, it is judged that the terminal device $4_1$ is in the service area of the high speed downlink network 6 and the processing of step S7 is executed. While, when it is judged that the physical medium $50_2$ does not receive the report channel BCCH of the high speed downlink network 6, the processing of the steps S2 and S6 are repeated.

Note that the processing of steps S6 to S8 are performed in parallel with the processing of steps S2 to S5.

Step S7: The system information obtained from the report channel BCCH of the high speed downlink network 6 is stored in the physical medium control portion $51_2$.

Step S8: In the mobile management portion $60_2$, when the processing of step S7 is completed, a reception enable instruction mark indicating that communication via the high speed downlink network 6 is possible is displayed on the display 90.

Namely, when it is judged that the terminal device $4_1$ is in the service area of the high speed downlink network 6, an authentication procedure and position registration are not performed.

[Second Example of Operation]

In the second example of the operation, an example of an operation where a high speed transmission request of a content signal is output from the terminal device $4_1$ to the high speed downlink switching center 8 will be explained.

Figure 5:
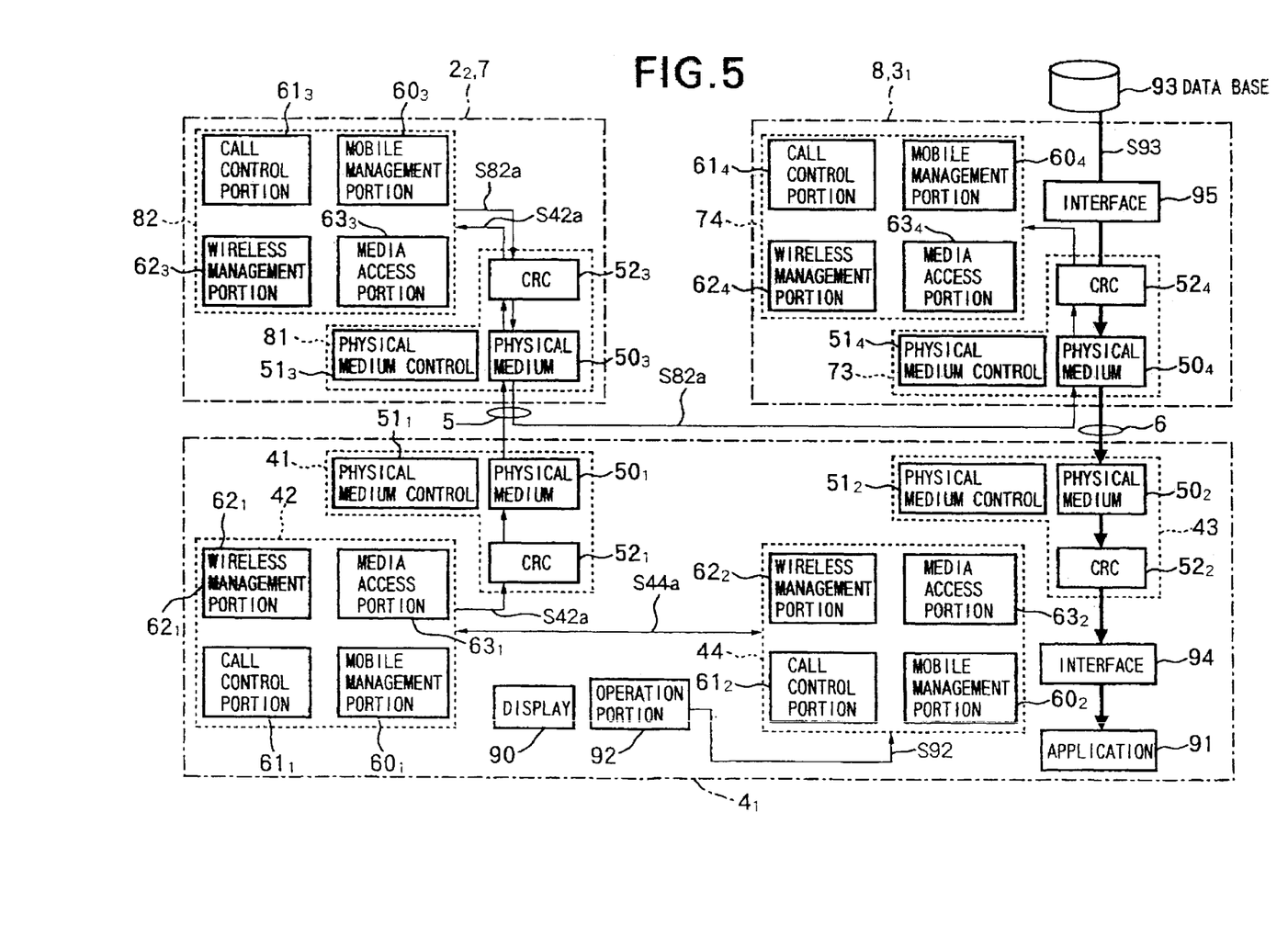
FIG. 5 is a view for explaining a signal flow when a high speed transmission request of a content signal is issued from a terminal device to a high speed downlink switching center.
Figure 6:
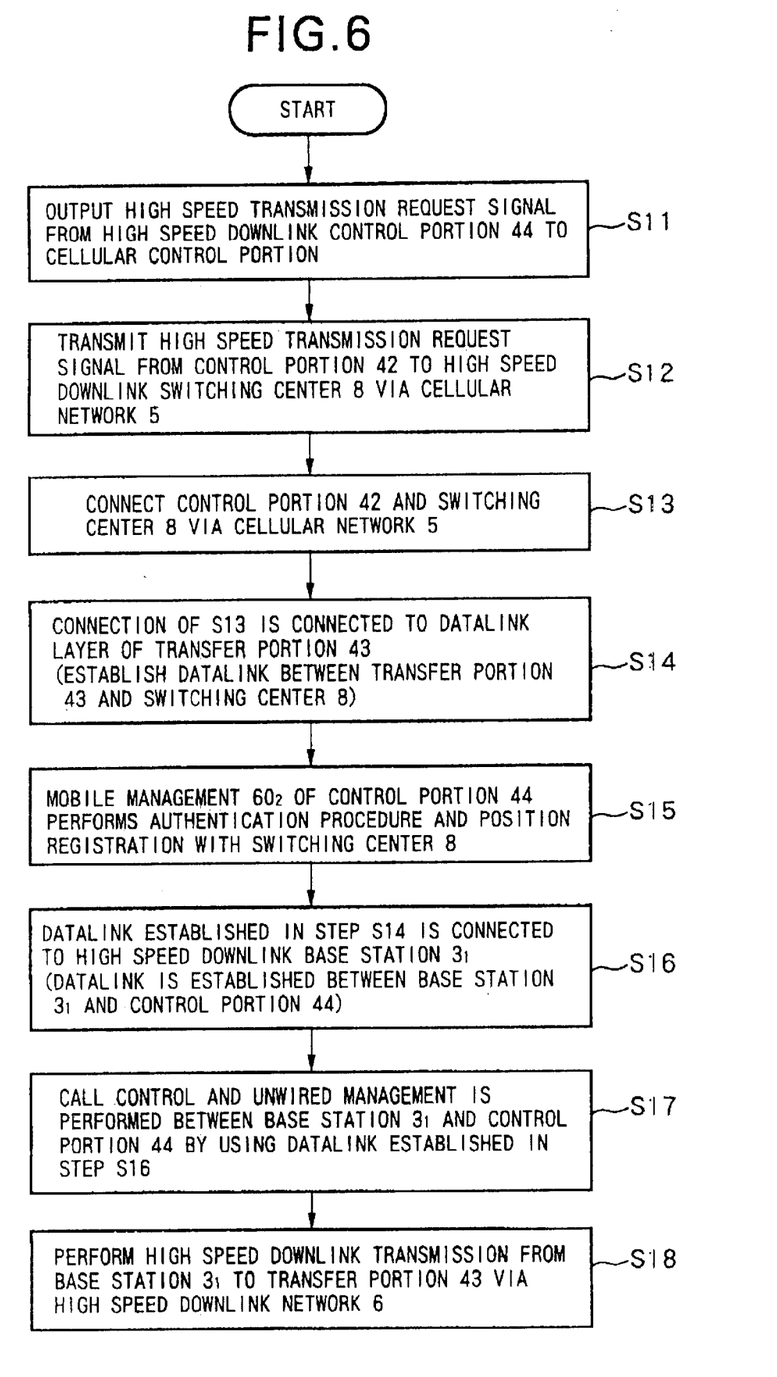
FIG. 6 is a flow chart of an operation shown in FIG. 5.

FIG. 5 is a view for explaining when a high speed transmission request of a content signal is output from the terminal device $4_1$ to the high speed downlink switching center 8, and FIG. 6 is a flow chart of the operation shown in FIG. 5.

Step S11: For example, an operation signal S92 corresponding to the operation of the operation portion 92 by the user is output to the high speed downlink control portion 44, and a high speed transmission request signal S44a for example requesting transmission of a predetermined content signal via the high speed downlink network 6 is transmitted from the high speed downlink control portion 44 to the cellular control portion 42.

Step S12: In the call control portion $61_1$ of the cellular control portion 42, transmission control is performed corresponding to the high speed request signal S44a and a high speed transmission request signal S42a is output from the cellular control portion 42 to the cellular transfer portion 41.

The high speed transmission request signal S42a after given a CRC code in the CRC processing portion $52_1$ of the cellular transfer portion 41 is transmitted from the physical medium $50_1$ to the cellular base station $2_2$ via the cellular network 5 under the control of the physical medium control portion $51_1$.

Then, the high speed transmission request signal S42a is subjected to error correction processing in the CRC processing portion $52_3$ of the cellular base station $2_2$ and then output to the cellular control portion 82.

Then, in the call control portion $61_3$ of the cellular control portion 82, the transmission control corresponding to the high speed transmission request signal S42a is performed and a high speed transmission request signal S82a is output from the cellular control portion 82 to the cellular transfer portion 81.

The high speed transmission request signal S82a given a CRC in the CRC processing portion $52_3$ of the cellular transfer portion 81 is transmitted from the physical medium $50_3$ to the high speed downlink switching center 8 via the cellular network 5 under the control of the physical medium control portion $51_3$.

Step S13: Due to the processing of step S12, an information channel (TCH: traffic channel) between the automobile cellular switching center 7 and the high speed downlink switching center 8 and an information channel TCH between the cellular base station $2_2$ and the terminal device $4_1$ are obtained via the cellular network 5 and a data link (a logical communication path between transmitting and receiving nodes) is established by the information channels.

Step S14: The data link established at step S13 is connected to the data link layer of the high speed downlink transfer portion 43 by a cellular transfer portion 41. As a result, a data link is established between the high speed downlink switching center 8, the automobile cellular switching center 7, the cellular transfer portion 41, and the high speed downlink transfer portion 43.

Step S15: An authentication procedure is performed by the mobile management portion $60_2$ of the high speed downlink control portion 44 with the high speed downlink switching center 8. Also, position registration for registering the position of the terminal device $4_1$ to the high speed downlink switching center 8 is performed in units of cells.

In the present embodiment, it is registered in the position registration that the terminal device $4_1$ is positioned in the service area $6_1$ (FIG. 3) of the high speed downlink base station $3_1$.

Step S16: The data link established in step S14 is further connected to the high speed downlink base station $3_1$ from the high speed downlink switching center 8.

As a result, a data link is established between the high speed downlink base station $3_1$, the high speed downlink switching center 8, the automobile cellular switching center 7, the cellular transfer portion 41, the cellular control portion 42, and the high speed downlink control portion 44.

Step S17: Wireless control and call control explained below are performed by using the data link via the cellular network 5 established in step S16.

Namely, wireless control such as selection of cells, setting, maintenance, switching, and cutting of wireless lines is performed between a wireless management portion $62_4$ of the high speed downlink base station $3_1$ and a wireless management portion of the high speed downlink control portion 44 of the terminal device $4_1$.

Also, call control such as transmission, reception, and hand-over is performed between the call control portion $61_4$ of the high speed downlink base station $3_1$ and the call control portion $61_2$ of the high speed downlink control portion 44 of the terminal device $4_1$.

As a result, it becomes possible to transmit a content signal from the high speed downlink base station $3_1$ to the terminal device $4_1$ via the high speed downlink network 6.

Step S18: By using the data link via the cellular network 5 established in step S16, communication conditions such as the transmission time and modulation format of a content signal arriving via the high speed downlink network 6 are negotiated between the physical medium control portion $51_4$ of the high speed downlink base station $3_1$ and the physical medium control portion $51_2$ of the high speed downlink transfer portion 43 of the terminal device $4_1$. As a result of the negotiation, one modulation format is selected from BPSK, QPSK, 8PSK, and 16QAM so as to fulfill a predetermined bit rate and error rate, for example, by considering the distance between the high speed downlink base station $3_1$ and the terminal device $4_1$, weather, etc. When the high speed downlink network 6 is for performing packet communication, the number of packets to be transmitted etc. are decided.

Furthermore, the content signal S93 requested by the high speed transmission request signal S82a received at step S12 is read from the data base 93 in the high speed downlink control portion 74.

Then, based on the communication conditions decided in the negotiation, the content signal S93 read from the data base 93 is transmitted from the high speed downlink base station $3_1$ to the terminal device $4_1$ via the high speed downlink network 6.

[Third Example of Operation]

In the third example of operation, an example of the operation of transmitting a content signal from the high speed downlink switching center 8 to the terminal device $4_1$ via the high speed downlink network 6 in response to a request from the high speed downlink switching center 8 will be explained.

Figure 7:
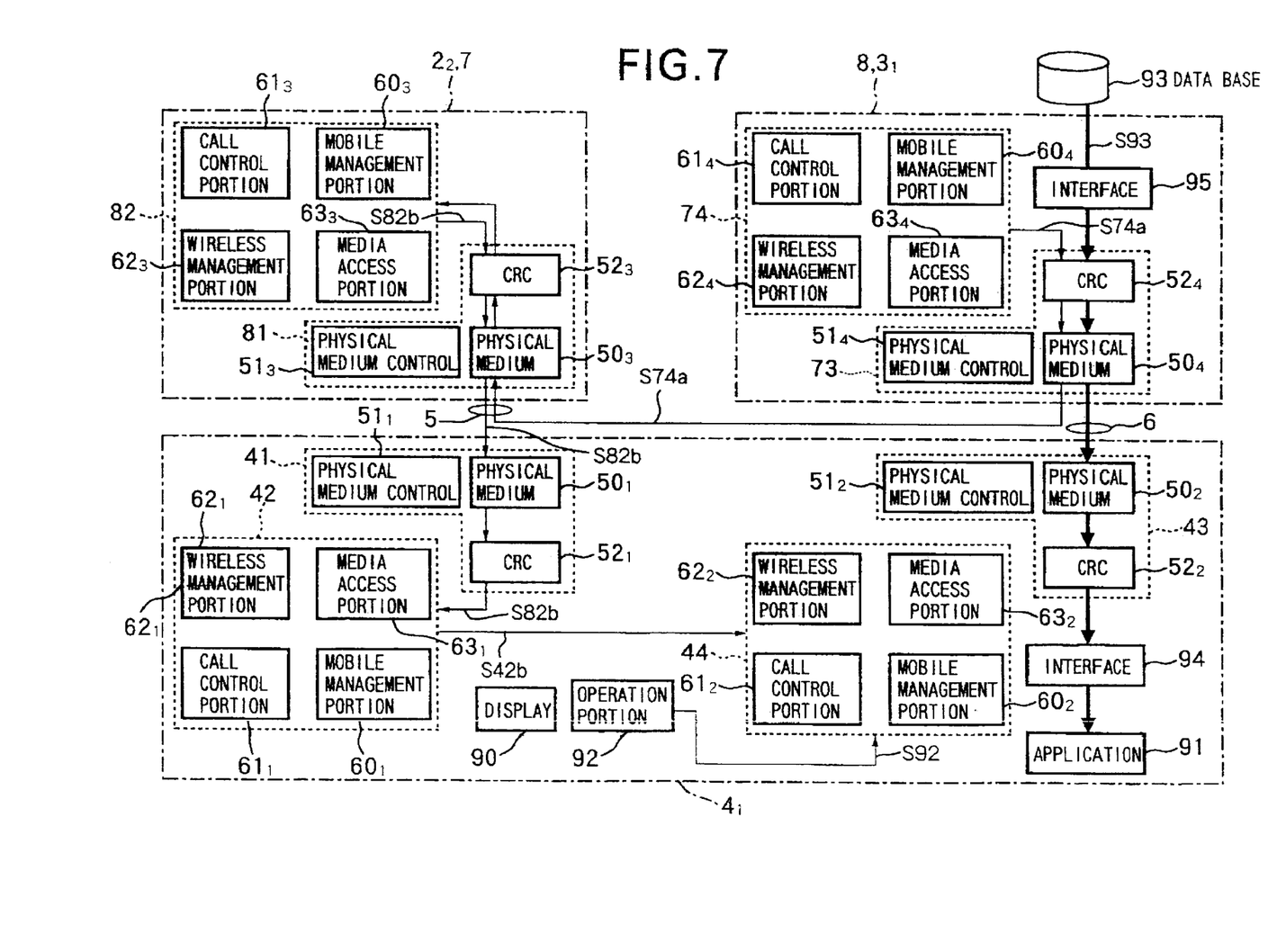
FIG. 7 is a view for explaining a signal flow of an example of the operation when transmitting a content signal from a high speed downlink switching center to a terminal device via a high speed downlink network by a request from the high speed downlink switching center.
Figure 8:
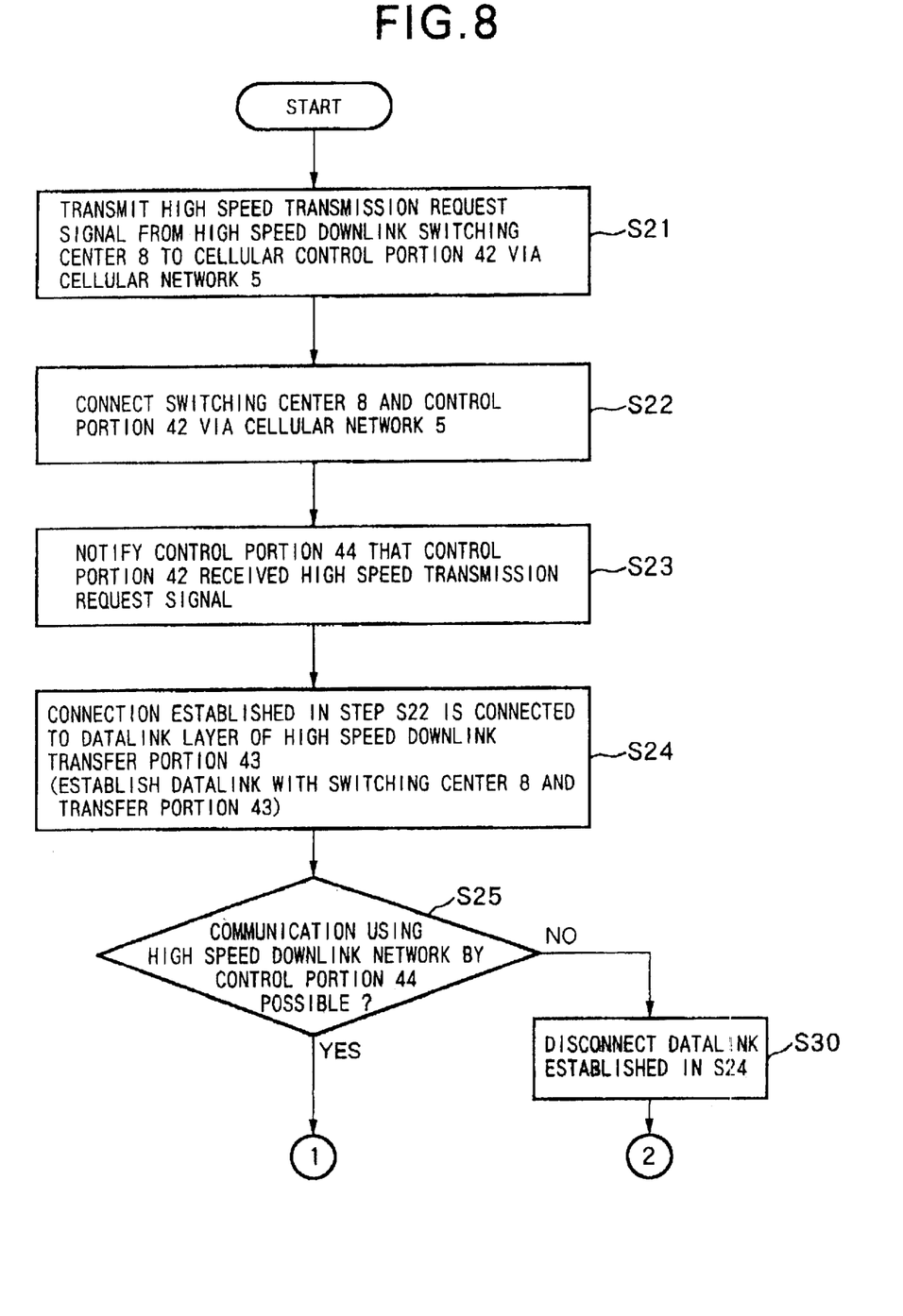
FIG. 8 is a flow chart for explaining an operation shown in FIG. 7.
Figure 9:
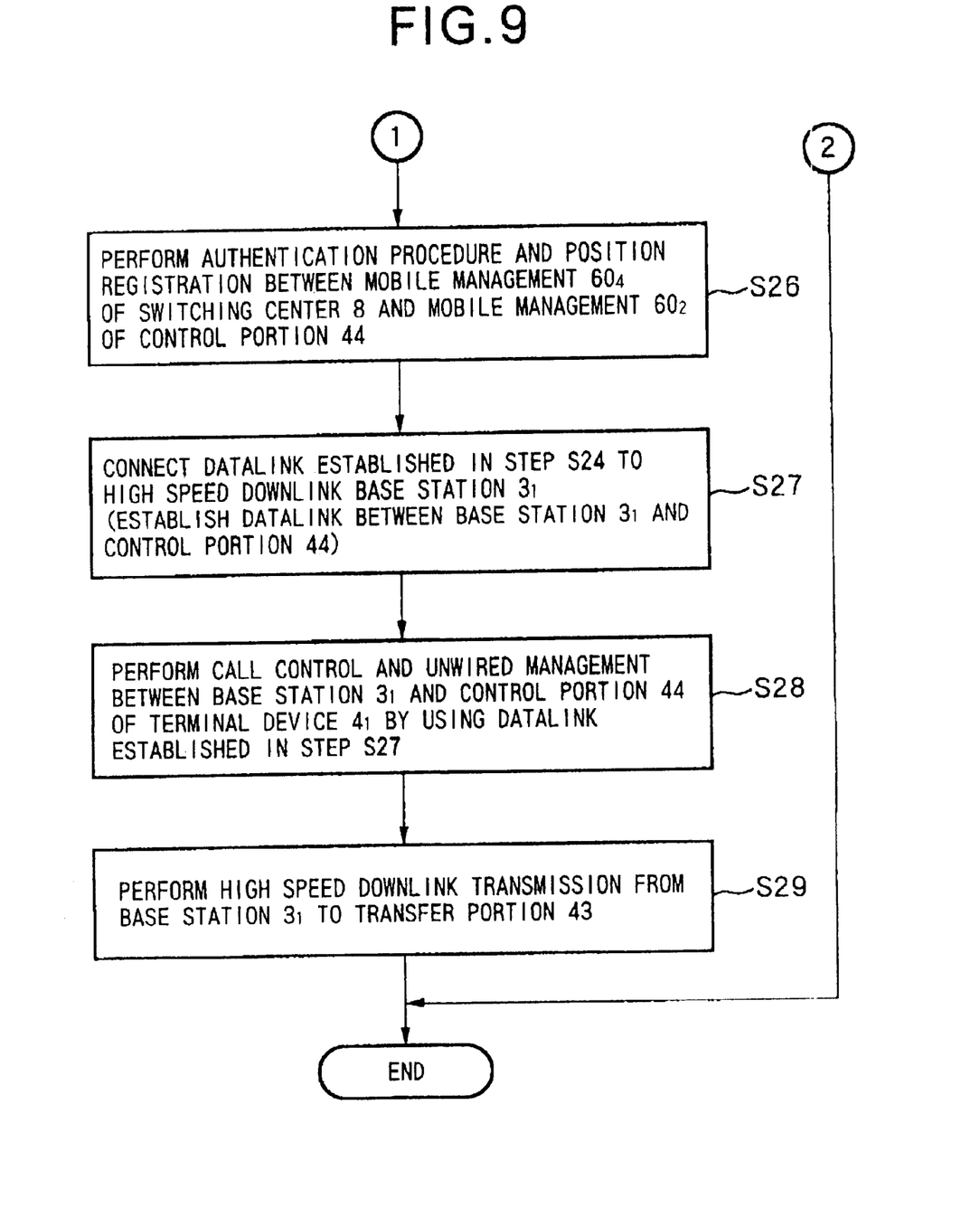
FIG. 9 is a flow chart for explaining an operation shown in FIG. 7.
Figure 10A:
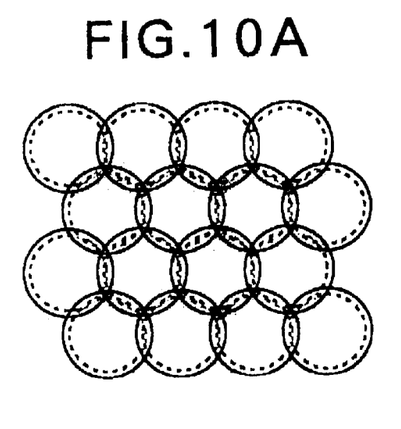
FIGS. 10A to 10E are views for explaining other examples of service areas of the cellular network and high speed downlink network shown in FIG. 1.
Figure 10B:
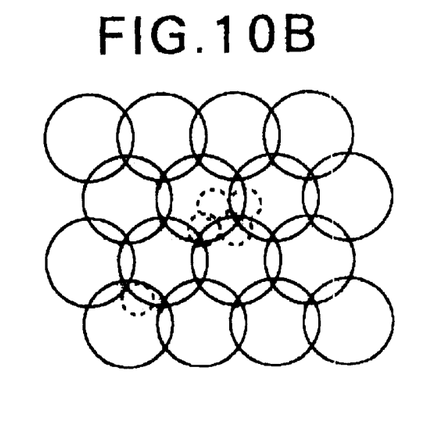
Figure 10C:
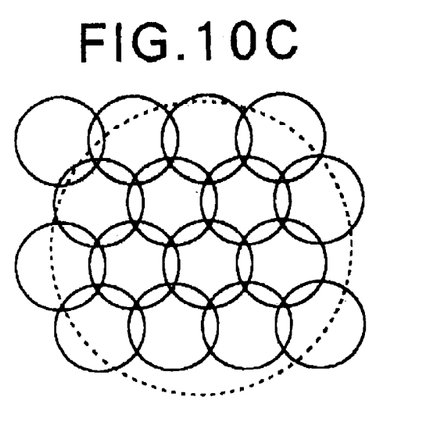
Figure 10D:
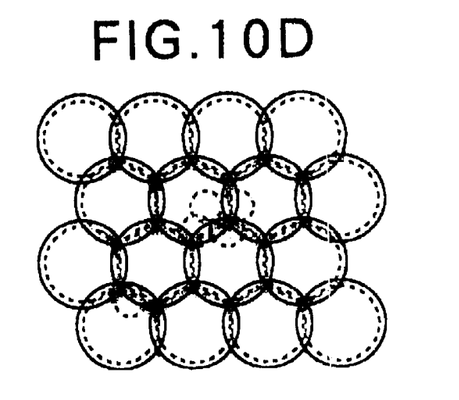
Figure 10E:
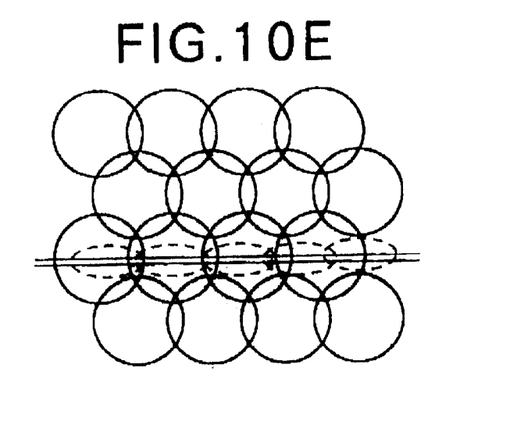

FIG. 7 is a view for explaining a signal flow of the example of the operation of transmitting a content signal from the high speed downlink switching center 8 to the terminal device $4_1$ via the high speed downlink. network 6 in response to a request from the high speed downlink switching center 8, while FIGS. 8 and 9 are flow charts for explaining the operation shown in FIG. 7.

Step S21: For example, in response to a high speed transmission request signal requesting transmission of a predetermined content signal via the high speed downlink network 6, transmission control is performed in the call control portion $61_4$ of the high speed downlink switching center 8 and a high speed transmission request signal S74a is output from the high speed downlink control portion 74 to the high speed downlink transfer portion 73.

The high speed transmission request signal S74a is given a CRC in the CRC processing portion $52_4$ of the high speed downlink transfer portion 73 and transmitted from the physical medium $50_4$ to the cellular base station $2_2$ via the cellular network 5 under control of the physical medium control portion $51_4$.

Then, the high speed transmission request signal S74a after error correction processing in the CRC processing portion $52_3$ of the cellular base station $2_2$ is output to the cellular control portion 82.

Then, the call control portion $61_3$ of the cellular control portion 82 performs transmission control in accordance with the high speed transmission request signal S74a and a high speed transmission request signal S82b is output from the cellular control portion 82 to the cellular transfer portion 81.

The high speed transmission request signal S82b after given a CRC in the CRC processing portion $52_3$ of the cellular transfer portion 81 is transferred from the physical medium $50_3$ to the terminal device $4_1$ via the cellular network 5 under the control of the physical medium control portion $51_3$.

The high speed transmission request signal S82b after error correction processing in the CRC processing portion $52_2$ of the terminal device $4_1$ is output to the cellular control portion 42.

Step S22: An information channel TCH between the high speed downlink switching center 8 and the automobile cellular switching center 7 and an information channel TCH between the automobile cellular switching center 7 and the terminal device $4_1$ are obtained via the cellular network 5. A data link is established by these information channels.

Step S23: A high speed transmission request signal S42b indicating that the high speed transmission request signal S82b was received is output from the cellular control portion 42 of the terminal device $4_1$ to the high speed downlink control portion 44.

Step S24: The data link established in step S22 is connected to the data link layer of the high speed downlink transfer portion 43 by the cellular transfer portion 41 of the terminal device $4_1$. As a result, a data link is established between the high speed downlink switching center 8, the automobile cellular switching center 7, the cellular transfer portion 41, and the high speed downlink transfer portion 43.

Step S25: In the mobile management portion $60_2$ of the high speed downlink control portion 44 of the terminal device $4_1$, it is judged, for example, whether or not the system information obtained from the report channel of the high speed downlink network 6 in the above step S7 shown in FIG. 4 is correctly stored. When judged that it is correctly stored, communication via the high speed downlink network 6 is judged to be possible and the processing of step S26 is executed, while, otherwise, the processing of step S30 is executed.

Step S30: In this case, the data link established in step S24 is cut off.

Step S26: An authentication procedure is performed with the mobile management portion $60_2$ of the high speed downlink control portion 44 and position registration is performed for registering a position of the terminal device $4_1$ to the high speed downlink switching center 8 in units of cells.

In the present embodiment, by the position registration, it is registered that the terminal device $4_1$ is positioned in the service area $6_1$ of the high speed downlink base station $3_1$.

Step S27: The data link established in step S24 is further connected to the high speed downlink base station $3_1$.

As a result, a data link is established between the high speed downlink base station $3_1$, the high speed downlink switching center 8, the automobile cellular switching center 7, the cellular transfer portion 41, the cellular control portion 42, and the high speed downlink control portion 44.

Step S28: By using the data link via the cellular network 5 established in step S27, the wireless control and call control described below are performed.

Namely, wireless control such as selection of cells, setting, maintenance, switching, and disconnection of wireless lines is performed between a wireless management portion $62_4$ of the high speed downlink base station $3_1$ and a wireless management portion of the high speed downlink control portion 44 of the terminal device $4_1$.

Also, call control such as transmission, reception, and hand-over is performed between the call control portion $61_4$ of the high speed downlink base station $3_1$ and the call control portion $61_2$ of the high speed downlink control portion 44 of the terminal device $4_1$.

As a result, it becomes possible to transmit a content signal from the high speed downlink base station $3_1$ to the terminal device $4_1$ via the high speed downlink network 6.

Step S29: By using the data link via the cellular network 5 established in step S27, communication conditions such as the transmission time and modulation format of a content signal arriving via the high speed downlink network 6 are negotiated between the physical medium control portion $51_4$ of the high speed downlink base station $3_1$ and the physical medium control portion $51_2$ of the high speed downlink transfer portion 43 of the terminal device $4_1$.

Then, based on the communication conditions decided by the negotiation, a content signal is transmitted from the high speed downlink base station $3_1$ to the terminal device $4_1$ via the high speed downlink network 6.

As explained above, according to the communication system 1, the communication speed in the down direction can be made higher just by adding the high speed downlink system using the high speed downlink base stations $3_1$ to $3_4$ and the high speed downlink network 6 to the existing system using the cellular base stations $2_1$ to $2_{16}$ and the cellular network 5. Therefore, the work load accompanying the faster speed can be reduced.

Also, as shown in FIG. 3, since it is not necessary to make the service area of the cellular network 5 and the service area of the high speed downlink network 6 the same, it is possible to enlarge the service area of the high speed downlink network 6 step by step in order in accordance with need and working status.

Furthermore, according to the communication system 1, as shown in FIG. 2, since the mobile management portion, call control portion, and wireless management portion are separately provided for the portion for bidirectional communication via the cellular network 5 and the portion for high speed downlink communication via the high speed downlink network 6, the frequency bandwidth, modulation format, cell structure, etc. can be set separately in accordance with need between the communication via the cellular network 5 and the communication via the high speed downlink network 6.

Also, according to the communication system 1, since the data link of the communication using the cellular network 5 and the data link of the communication using the high speed downlink network 6 are connected by the data link layer, transmission and reception of control information between the data links can be performed with high reliability. Also, the communication using the cellular network 5 and the communication using the high speed downlink network 6 can be handled as one channel at an upper layer of the data link layer.

The present invention is not limited to the above embodiments.

For example, instead of the cellular network 5 in the above embodiments, an ISDN or other cable network or a satellite telephone line network or other bidirectional communication network may be used. Also, as the broadcast network 6, use may be made, for example, of CS broadcasting, a communication line of cable TV, and Multi-Media Access Control (MMAC) instead of a ground wave.

The service areas of the cellular network 5 and the service areas of the high speed downlink network 6 may be decided as shown in FIGS. 10A to 10E in addition to the ones shown in FIG. 3.

In the same way as in FIG. 3, in FIGS. 10A to 10E, the solid lines indicate the service areas of the cellular network 5 and the dotted lines indicate the service areas of the high speed downlink network 6.

[Effects of the Invention]

As explained above, according to the above embodiment, the communication speed in the down direction can be easily improved by expanding the functions of the existing apparatus.

While the invention has been described with reference to specific embodiment chosen for purpose of illustration, it should be apparent that numerous modifications could be made thereto by those skilled in the art without departing from the basic concept and scope of the invention.

What is claimed:

1. A communication apparatus comprising:
   a transmitting and receiving means for transmitting and receiving a control signal to and from a first communication apparatus;
   a first control means for controlling the bidirectional communication between said first communication apparatus using said transmitting and receiving means;
   a receiving means for receiving a content signal from a second communication apparatus; and
   a second control means for transmitting and receiving a control signal to and from said second communication apparatus via said first communication apparatus by using said bidirectional communication controlled by said first control means and controlling the reception of said content signal by said receiving means based on results of the transmission and reception,
   wherein said transmitting and receiving means transmits and receives said control signal to and from said first communication apparatus by using a first wireless network,
   wherein said receiving means receives said content signal from said second communication apparatus by using a second wireless network in which communication in only one direction is performed,
   wherein the first communication apparatus is separate from the second communication apparatus, and
   wherein a bit rate of communication using said second wireless network is larger than a bit rate of communication using said first wireless network.

2. A communication apparatus as set forth in claim 1, wherein:
   said second control means performs at least one of mobile management, call control, and wireless management necessary for receiving said content signal using said second wireless network with said second communication apparatus by using said bidirectional communication.

3. A communication apparatus as set forth in claim 2, wherein:
   said first control means performs mobile management, call control, and wireless management necessary for said bidirectional communication using said first wireless network in an independent form from the mobile management, call control, and wireless management by said second control means necessary for receiving said content signal using said second wireless network.

4. A communication apparatus as set forth in claim 2, wherein said second control means does not perform position management for notifying a position of the communication apparatus in a waiting state of communication using said second wireless network.

5. A communication apparatus comprising:
   a transmitting and receiving means for transmitting and receiving a control signal to and from a first communication apparatus;
   a first control means for controlling the bidirectional communication between said first communication apparatus using said transmitting and receiving means;
   a receiving means for receiving a content signal from a second communication apparatus; and
   a second control means for transmitting and receiving a control signal to and from said second communication apparatus via said first communication apparatus by using said bidirectional communication controlled by said first control means and controlling the reception of said content signal by said receiving means based on results of the transmission and reception,
   wherein said second control means selects one communication condition among a plurality of communication conditions which include at least one of a transmission time and a modulation format and controls reception of said content signal by said receiving means based on the selected communication condition by said transmission and reception of said control signal to and from said second communication apparatus.

6. A communication apparatus comprising:
   a transmitting and receiving means for transmitting and receiving a control signal to and from a first communication apparatus;
   a first control means for controlling the bidirectional communication between said first communication apparatus using said transmitting and receiving means;
   a receiving means for receiving a content signal from a second communication apparatus; and
   a second control means for transmitting and receiving a control signal to and from said second communication apparatus via said first communication apparatus by using said bidirectional communication controlled by said first control means and controlling the reception of said content signal by said receiving means based on results of the transmission and reception,
   wherein said transmitting and receiving means transmits and receives said control signal to and from said first communication apparatus by using a first wireless network,
   wherein said receiving means receives said content signal from said second communication apparatus by using a second wireless network in which communication in only one direction is performed,
   wherein the first communication apparatus is separate from the second communication apparatus, and
   wherein said second control means realizes connection with said second communication apparatus via said first communication apparatus by a data link layer.

7. A communication apparatus comprising:
   a transmitting and receiving means for transmitting and receiving a control signal to and from an other communication apparatus;
   a first control means for controlling bidirectional communication with said other communication apparatus using said transmitting and receiving means;

a transmitting means for transmitting a content signal to said other communication apparatus; and a second control means for transmitting and receiving said control signal to and from said other communication apparatus by using said bidirectional communication controlled by said first control means and controlling transmission of said content signal by said transmitting means based on results of said transmission and reception, wherein said transmitting and receiving means transmits and receives said control signal to and from said other communication apparatus by using a first wireless network, wherein said transmitting means transmits said content signal to said other communication apparatus by using a second wireless network in which communication in only one direction is performed, wherein the transmitting and receiving means is separate from the transmitting means, and wherein a bit rate of communication using said second wireless network is larger than a bit rate of communication using said first wireless network.

8. A communication apparatus as set forth in claim 7, wherein:

said second control means performs at least one of mobile management, call control, and wireless management necessary for receiving said content signal using said second wireless network with said second communication apparatus by using said bidirectional communication.

9. A communication apparatus as set forth in claim 7, wherein:

said first control means performs mobile management, call control, and wireless management necessary for said bidirectional communication using said first wireless network in an independent form from the mobile management, call control, and wireless management by said second control means necessary for receiving said content signal using said second wireless network.

10. A communication apparatus comprising:

a transmitting and receiving means for transmitting and receiving a control signal to and from an other communication apparatus;

a first control means for controlling bidirectional communication with said other communication apparatus using said transmitting and receiving means;

a transmitting means for transmitting a content signal to said other communication apparatus; and a second control means for transmitting and receiving said control signal to and from said other communication apparatus by using said bidirectional communication controlled by said first control means and controlling transmission of said content signal by said transmitting means based on results of said transmission and reception, wherein said second control means selects one communication condition among a plurality of communication conditions which include at least one of a transmission time and a modulation format and controls reception of said content signal by said receiving means based on the selected communication condition by said transmission and reception of said control signal to and from said other communication apparatus.

11. A communication apparatus comprising:

a transmitting and receiving means for transmitting and receiving a control signal to and from an other communication apparatus;

a first control means for controlling bidirectional communication with said other communication apparatus using said transmitting and receiving means;

a transmitting means for transmitting a content signal to said other communication apparatus; and a second control means for transmitting and receiving said control signal to and from said other communication apparatus by using said bidirectional communication controlled by said first control means and controlling transmission of said content signal by said transmitting means based on results of said transmission and reception, wherein said transmitting and receiving means transmits and receives said control signal to and from said other communication apparatus by using a first wireless network, wherein said transmitting means transmits said content signal to said other communication apparatus by using a second wireless network in which communication in only one direction is performed, wherein the transmitting and receiving means is separate from the transmitting means, and wherein said second control means realizes connection with said other communication apparatus via said first communication apparatus by a data link layer.

12. A communication system for performing bidirectional communication between a first communication apparatus and a second communication apparatus, wherein:

said first communication apparatus comprises is a first transmitting and receiving means for transmitting and receiving a control signal with said second communication apparatus;

a first control means for controlling bidirectional communication with said second communication apparatus using said first transmitting and receiving means a transmitting means for transmitting a content signal to said second communication apparatus; and a second control means for transmitting and receiving said control signal to and from said second communication signal by using said bidirectional communication controlled by said first communication means and controlling transmission of said content signal by said first transmitting means based on results of the transmission and reception; and said second communication apparatus comprises:

a second transmitting and receiving means for transmitting and receiving a control signal with said first communication apparatus;

a third control means for controlling bidirectional communication with said second communication apparatus using said second transmitting and receiving means;

a receiving means for receiving a content signal from said second communication apparatus; and a fourth control means for transmitting and receiving said control signal to and from said second communication signal by using said bidirectional communication controlled by said third communication means and controlling reception of said content signal by said receiving means based on results of the transmission and reception.

13. A communication apparatus as set forth in claim 11 wherein:

said first transmitting and receiving means and said second transmitting and receiving means transmits and receives said control signal by using a first wireless network; and said receiving means receives said content signal from said transmission means via a second wireless network.

14. A communication apparatus as set forth in claim 11, wherein said second control means performs at least one of mobile management, call control, and wireless management necessary for receiving said content signal using said second wireless network with said fourth control means by using said bidirectional communication.

15. A communication apparatus as set forth in claim 14, wherein said first control means and said third control means perform mobile management, call control, and wireless management necessary for said bidirectional communication using said first wireless network in an independent form from mobile management, call control, and wireless management by said second control means and said fourth control means necessary for receiving said content signal using said second wireless network.

16. A communication apparatus as set forth in claim 14, wherein said fourth control means does not perform position management for notifying a position of said second communication apparatus to said first communication apparatus in a waiting state of communication using said second wireless network.

17. A communication apparatus as set forth in claim 12, wherein said fourth control means selects one communication condition from a plurality of communication conditions with said second control means by said transmission and reception of said control signal and controls receipt of said content signal by said receiving means based on said selected communication condition.

18. A communication apparatus as set forth in claim 12, wherein said second control means realizes connection with said fourth control means via said first control means and said third control means by a data link layer.

19. A communication apparatus as set forth in claim 13, wherein a bit rate of communication using said second wireless network is larger than a bit rate of communication using said first wireless network.

20. A communication method for performing communication between communication apparatus, said method including the steps of:

performing bidirectional communication between a first communication apparatus and a second communication apparatus via a first wireless network;

transmitting a content signal from a third communication apparatus to said second communication apparatus via a second wireless network in which communication in only one direction is performed; and performing mobile management, call control, and wireless management necessary for said bidirectional communication using said first wireless network in an independent form from mobile management, call control, and wireless management necessary for receiving said content signal using said second wireless network, wherein the first communication apparatus is separate from the third communication apparatus, and wherein a bit rate of communication using said second wireless network is larger than a bit rate of communication using said first wireless network.

* * * * *